United States Patent [19]
Knight et al.

[11] 3,728,357
[45] Apr. 17, 1973

[54] 2-(SUBSTITUTED-METHYL)-5,6-DIHYDRO-1,4-OXATHIIN-3-CARBOXAMIDES

[75] Inventors: Barry I. Knight; Michael Curcumelli-Rodostamo; Marshall Kulka, all of Guelph, Ontario, Canada; Bogislav Von Schmeling, Hamden, Conn.

[73] Assignee: Uniroyal, Inc.

[22] Filed: Sept. 8, 1970

[21] Appl. No.: 78,344

[52] U.S. Cl. ............260/327 P, 260/247.1, 260/306, 424/276
[51] Int. Cl. ............................................C07d 89/14
[58] Field of Search ................................260/327 P

[56] References Cited

UNITED STATES PATENTS 3,082,214  3/1963  Bluestone..........................260/327 P
2,158,019  5/1939  Clifford............................260/327 P Primary Examiner—Alex Mazel
Assistant Examiner—Jose Tovar
Attorney—James J. Long

[57] ABSTRACT

Chemicals of the formula

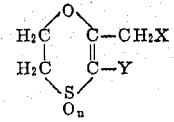

wherein X can be various substituents, particularly halogen and univalent radicals containing a hetero atom, and Y is carboxamide, are useful as agricultural fungicides. The carboxamide may be variously substituted. Examples are 2-chloromethyl-5,6-dihydro-1,4-oxathiin-3-carboxanilide (X = chlorine, Y = phenylcarbamoyl, $n$ = zero) and 5,6-dihydro-2-thiocyanomethyl-1,4-oxathiin-3-carboxanilide (X = thiocyano, Y = phenylcarbamoyl, n = zero).

5 Claims, No Drawings

2-(SUBSTITUTED-METHYL)-5,6-DIHYDRO-1,4-OXATHIIN-3-CARBOXAMIDES

BACKGROUND OF THE INVENTION

1. Field of the Invention

This invention relates to new chemicals and to the control of agricultural fungus disease in plants by application of such chemicals.

2. Description of the Prior Art 5,6-Dihydro-2-methyl-1,4-oxathiin-3-carboxamides are known as agricultural fungicides, as disclosed in U.S. Pat. No. 3,249,499 issued to von Schmeling et al. May 3, 1966, No. 3,393,202 issued to Kulka et al. July 16, 1968, No. 3,399,214 issued to Kulka et al. Aug. 27, 1968, and No. 3,402,241 issued to von Schmeling et al. Sept. 17, 1968 (wherein the chemicals are referred to as "2,3-dihydro-5-carboxamido-6-methyl-1,4-oxathiins" and the like). The present chemicals differ from the chemicals of these patents in that in the present chemicals the 2-methyl substituent is substituted, whereas in the said patents the methyl group (designated "6-methyl" the patents) is unsubstituted.

French Pat. No. 1,494,186, Chimetron S.A.R.L., July 31, 1967, discloses the conversion of "2,3-dihydro-5-carbamoyl-6-alkyl-1, 4-oxathiins" (more properly, 2-alkyl-5,6-dihydro-1,4-oxathiin-3-carboxamides) , where the 6-alkyl substituent has from one to five carbon atoms, to corresponding N-sulfenyl chemicals, for use as fungicides. The present chemicals differ from the starting chemicals of the French patent in that the present chemicals have a substituted-methyl group in the 2-position, whereas the starting chemicals of the French patent have in the corresponding position (there called the 6-position) an unsubstituted $C_1 - C_5$ alkyl group.

SUMMARY OF THE INVENTION

The invention is concerned with new chemicals comprising 5,6-dihydro-1,4-oxathiin-3-carboxamides with a mono-substituted methyl group at position 2 as well as to the control of plant fungal diseases by application of such chemicals.

DETAILED DISCLOSURE

The chemicals of the invention are 2-(substituted-methyl)-5,6-dihydro-1,4-oxathiin-3-carboxamides having from zero to two oxygen atoms attached to the sulfur at the 4-position, wherein the 2-(substituted-methyl) group may be represented by the formula — $CH_2X$, X being a monovalent substituent other than hydrogen or alkyl, notably halogen (e.g., chlorine, bromine, etc.), or other substituent containing a hetero atom (that is, an atom other than hydrogen or carbon). Many such chemicals are represented by formula I:

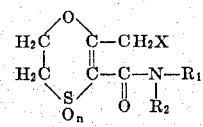

wherein $n$ is 0, 1 or 2. $R_1$ and $R_2$ are the same or different and may have various values as disclosed for example in the U. S. patents referred to above, particularly hydrogen, $NH_2$, and univalent organic groups. Of the latter the following may be mentioned: alkyl, aryl, aralkyl, alkaryl, cycloalkyl, alkenyl, cycloalkenyl, heterocyclic radicals, and various combinations thereof; also mono- and poly-substituted derivatives of the above groups (e.g., p-methoxyphenyl). X is ordinarily halogen (e.g., chlorine, bromine, etc.) ,alkoxy, acyloxy, alkylamino, arylamino, aralkylamino, alkarylamino, alkylthio, arylthio, aralkylthio, alkarylthio, mercapto, morpholino, and various groups derived from the above by substitution, such as alkoxythionothio, thiocyano, halophenylthio, mono- and dialkylthiocarbamoylthio.

The chemicals of the invention may be used for various purposes. Thus they may be employed as microbiocides, such as fungicides, and as intermediates for the synthesis of other chemicals.

The compounds with $n$ = O, X = halogen, may be prepared by halogenation of the corresponding dihydrooxathiins in which X = H (U.S. Pat. No. 3,393,202 cited above). Thus 2-chloromethyl-5,6-dihydro-1,4-oxathiin-3-carboxanilide (I, $n$ = O, $R_1$ = H, $R_2$ = $C_6H_5$, X = Cl) may be prepared by chlorination of 5,6-dihydro-2-methyl-1,4-oxathiin-3-carboxanilide (I, $n$ = O, $R_1$ = X = H, $R_2$ = $C_6H_5$) with sulfuryl chloride.

The halogenomethyl sulfides (I, $n$ = O, X = halogen) may be used for the synthesis of the other sulfides of the invention (I, $n$ = O) by conventional substitution reactions (Examples 2 – 9).

The sulfoxides and sulfones (I, $n$ = 1 and 2) may be prepared by oxidation of the corresponding sulfides (I, $n$ = O) with hydrogen peroxide at the appropriate temperature (U.S. Pat. No. 3,399,214 cited above). Thus 2-chloromethyl-5,6-dihydro-1,4-oxathiin-3-carboxanilide-4,4-dioxide (I, $n$ = 2, $R_1$ = H, $R_2$ = $C_6H_5$, X = Cl) may be obtained by hydrogen peroxide oxidation of the corresponding chloromethyl sulfide (I, $n$ = O, $R_1$ = H, $R_2$ = $C_6H_5$, X = Cl) at 80°.

The halogenomethyl sulfoxides and sulfones (I, $n$ = 1 and 2, X = halogen) may be used as intermediates in the synthesis, by standard substitution reactions, of other sulfoxides and sulfones of the present invention.

The following examples will serve to illustrate the practice of the invention in more detail.

EXAMPLE 1

2-Chloromethyl-5,6-dihydro-1,4-oxathiin-3-carboxanilide (I, $n$ = O, $R_1$ = H, $R_2$ = $C_6H_5$, X = Cl)

Method 1

Sulfuryl chloride (44.0 g, 0.327 mole) was added portion-wise to a stirred suspension of 5, 6-dihydro-2-methyl-1,4-oxathiin-3-carboxanilide (75.0 g, 0.319 mole) in benzene (150 ml) kept at 25°–30°. The reaction mixture was allowed to stand overnight at room temperature. The crystallized product was pulverized, and the reaction mixture stirred while a solution of $NaHCO_3$ (50g) in water (400 ml) was added in portions. The reaction mixture was stirred for a further 30 min., cooled to 10°, filtered, and the product washed with water and a little benzene. Yield 72.0 g (84 percent); mp 103°–105°.

Method 2

To a stirred suspension of 5,6-dihydro-2-methyl-1,4-oxathiin-3-carboxanilide (25.0 g, 0.106 mole) in toluene (150 ml) was added dropwise sulfuryl chloride (14.0 g, 0.104 mole) at such a rate as to keep the temperature below 30°. Stirring was continued for 3 hours after the addition was completed. Air was then blown lightly over the reaction mixture to remove HCl and $SO_2$ and to reduce the solution volume to about 100 ml. The reaction mixture was cooled overnight to induce crystallization. The solid product was filtered off and washed with a little toluene. Yield 21.0 g (73 percent); mp 102°–104°.

EXAMPLE 2

2-Ethoxymethyl-5,6-dihydro-1,4-oxathiin-3-carboxanilide (I, $n = O$, $R_1 = H$, $R_2 = C_6H_5$, $X = OC_2H_5$)

A solution of 2-chloromethyl-5,6-dihydro-1,4-oxathiin-3-carboxanilide (15.0 g, 0.055 mole) and $K_2CO_3$ (4.0 g, 0.029 mole) in 95 percent ethanol (200 ml) and water (10 ml) was refluxed for 2 hours. The reaction mixture was taken to dryness under reduced pressure and the residue dissolved in chloroform. The resulting solution was washed with water and the chloroform removed under reduced pressure. The product was recrystallized from 95 percent ethanol. Yield 9.3 g (60 percent); mp 81°–82°.

EXAMPLE 3

2-Acetoxymethyl-5,6-dihydro-1,4-oxathiin-3-carboxanilide (I, $n = O$, $R_1 = H$, $R_2 = C_6H_5$, $X = OCOCH_3$)

A solution of 2-chloromethyl-5,6-dihydro-1,4-oxathiin-3-carboxanilide (40.0 g, 0.148 mole) and potassium acetate (15.0 g, 0.153 mole) in glacial acetic acid (400 ml) was stirred at 70°–80° for 3 hours. The reaction mixture was diluted with water (1.5 l) and extracted with chloroform. The chloroform was removed under reduced pressure and the residue recrystallized from 95 percent ethanol. Yield 35.0 g (80 percent); mp 92°–94.

EXAMPLE 4

2-Diethylaminomethyl-5,6-dihydro-1,4-oxathiin-3-carboxanilide (I, $n = O$, $R_1 = H$, $R_2 = C_6H_5$, $X = N(C_2H_5)_2$)

A solution of 2-chloromethyl-5,6-dihydro-1,4-oxathiin-3-carboxanilide (5.0 g, 0.019 mole) in diethylamine (50 ml) was refluxed for 1 hour. The diethylamine hydrochloride formed was removed by filtration and the filtrate taken to dryness under reduced pressure. The crude product was recrystallized from 95 percent ethanol. Yield 4.5 g (79 percent); mp 110°–112°.

EXAMPLE 5

2-[[5,6-Dihydro-3-(phenylcarbamoyl)-1,4-oxathiin-2-yl]methyl]-2-thiopseudourea monohydrochloride (I, $n = O$, $R_1 = O$, $R_1 = H$, $R_2 = C_6H_5$, $X = SC(NH_2)NH \cdot HCl$)

A solution of 2-chloromethyl-5,6-dihydro,-1,4-oxathiin-3-carboxanilide (27.0 g, 0.100 mole) and thiourea (9.0 g, 0.118 mole) in 95 percent ethanol (150 ml) was refluxed for 30 min., during which time the thiouronium salt began to precipitate. The reaction mixture was cooled, and the product filtered off and washed with ethanol. Yield 31.0 g (90 percent); mp 224°–226° (dec.).

EXAMPLE 6

5,6-Dihydro-2-mercaptomethyl-1,4-oxathiin-3-carboxanilide (I, $n = O$, $R_1 = H$, $R_2 = C_6H_5$, $X = SH$)

2-[[5,6-Dihydro-3-(phenylcarbamoyl)-1,4-oxathiin-2-yl]methyl]-2-thiopseudourea monohydrochloride (5.0 g, 0.014 mole) was dissolved in aqueous 2N NaOH and the resulting solution stirred for 20 min. The reaction mixture was filtered and the filtrate acidified with dilute aqueous HCl. The precipitate formed was collected and recrystallized from 95 percent ethanol. Yield 3,5 g (90 percent); mp 110°–111°.

EXAMPLE 7

2-(2-Benzothiazolylthiomethyl)-5,6-dihydro-1,4-oxathiin-3-carboxanilide (I, $n = O$, $R_1 = R_2 = C_6H_5$,

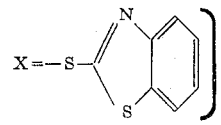

A solution of 2-chloromethyl-5,6-dihydro-1,4-oxathiin-3carboxanilide (13.5 g, 0.050 mole) and 2-mercaptobenzothiazole (8.5 g, 0.050 mole) in 95 percent ethanol (100 ml) was refluxed for 1 hours. The reaction mixture was cooled to 10° and the solid product collected and washed with ethanol. Yield 10.4 g (52 percent); mp 165°–168°.

EXAMPLE 8

2-(O,O-Diethylthiophosphonothiomethyl)-5,6-dihydro-1,4-oxathiin-3-carboxanilide (I, $n = O$, $R_1 = H$, $R_2 = C_6H_5$, $X = -SP(S)(OC_2H_5)_2$)

To a vigorously stirred mixture consisting of 2-chloromethyl-5,6-dihydro-1,4-oxathiin-3-carboxanilide (27.0 g, 0.100 mole) dissolved in benzene (200 ml) and $NaHCO_3$ (10.0 g, 0.119 mole) in water (200 ml) was added dropwise with stirring O,O-diethyldithiophosphoric acid (21.0 g, 0.128 mole) in benzene (100 ml). The mixture was stirred for 1 hour after the addition was completed. The layers were then separated and the benzene layer was washed with water. The benzene was removed under reduced pressure and the residue crystallized from 95 percent ethanol. Yield 31.0 g (74 percent); mp 104°–106°.

EXAMPLE 9

5,6-Dihydro-2-thiocyanomethyl-1,4-oxathiin-3-carboxanilide (I, $n = O$, $R_1 = H$, $R_2 = C_6H_5$, $X = SCN$)

To a stirred solution of 2-chloromethyl-5,6-dihydro-1,4-oxathiin-3-carboxanilide (2.7 5, 0.010 mole) in acetonitrile (30 ml) was added dropwise a solution of KSCN (1.2 g, 0.012 mole) in water (3 ml). After the addition was completed, the reaction mixture was heated on a steam-bath for 5 min., cooled and poured into cold water (800 ml). The crystalline solid formed was filtered off. Yield 2.6 g (89 percent); recrystallization from methanol yielded material melting at 113°–115°.

EXAMPLE 10

2-Chloromethyl-5,6-dihydro-1,4-oxathiin-3carboxanilide-4-oxide (I, $n=1$, $R_1=H$, $R_2=C_6H_5$, $X=Cl$)

To a stirred solution of 2-chloromethyl-5,6-dihydro-1,4-oxathiin-3-carboxanilide (27.0 g, 0.100 mole) in glacial acetic acid (50 ml) and water (5 ml) was added dropwise a solution of 30 percent hydrogen peroxide (12 ml, 0.106 mole) in acetic acid (13 ml). The reaction temperature was kept below 15° by use of an icebath during the addition and for a further 5 hours. The reaction mixture was then diluted with water (300 ml) and neutralized by the careful addition of sodium bicarbonate. The precipitate formed was collected and recrystallized from ethanol. Yield 13.0 g (45 percent); mp 149°–150°.

EXAMPLE 11

2-Chloromethyl-5,6-dihydro-1,4-oxathiin-3-carboxanilide-4,4-dioxide (I, $n=2$, $R_1=H$, $R_2=C_6H_5$, $X=Cl$)

To a solution of 2-chloromethyl-5,6-dihydro-1,4-oxathiin-3-carboxanilide (15.0 g, 0.056 mole) in glacial acetic acid (75 ml) was added a solution of 30 percent hydrogen peroxide (13.2 ml, 0.116 mole). The resulting solution was heated at 80° for 2.5 hours. The dark solution was taken to dryness in vacuo and the residue dissolved in benzene. The benzene solution was cooled to induce crystallization and the product collected and washed with methanol. Yield 11.0 g (65 percent); mp 136°–138° (dec.)

EXAMPLE 12

2-p-Chlorophenylthiomethyl-5,6-dihydro-1,4-oxathiin-3-carboxanilide-4-oxide (I, $n=1$, $R_1=H$, $R_2=C_6H_5$,

Method 1

To a stirred solution of 2-p-chlorophenylthiomethyl-5,6-dihydro-1,4-oxathiin-3-carboxanilide (16.4 g, 0.044 mole) in glacial acetic acid (40 ml) and water (5 ml) was added dropwise 30 percent hydrogen peroxide (5.3 ml, 0.047 mole) in acetic acid (5 ml). The reaction temperature was kept below 15° by cooling in an ice bath. After standing overnight in a refrigerator, the reaction mixture was poured into 200 ml of water. A white sticky product separated which was collected and dissolved in 95 percent ethanol. White crystals gradually separated and were recrystallized from 95 percent ethanol. Yield 6.4 g (37 percent); mp 146°–147°.

Method 2

To a solution of 2-chloromethyl-5,6-dihydro-1,4-oxathiin-3-carboxanilide-4-oxide (2.0 g, 0.007 mole) in methanol (25 ml) was added a solution of p-chlorobenzenethiol (1.0 g, 0.007 mole) and KOH (0.4 g, 0.007 mole) in methanol (25 ml). After being stirred for 3 hours at room temperature the reaction mixture was taken to dryness in vacuo and the residue dissolved in benzene. The benzene solution was washed with dilute aqueous NaOH and water. The benzene was removed in vacuo and the residue was crystallized from 95 percent ethanol. Yield 0.5 g (20 percent); mp 144°–146°.

The foregoing and further examples are summarized in the following Table I. the structural characteristics $n$, $R_1$, $R_2$, and X refer to general structure 1.

TABLE 1

| Example | n | $R_1$ | $R_2$ | X | M.P., degrees | Yield, percent |
|---|---|---|---|---|---|---|
| 1 | 0 | H | $C_6H_5$ | Cl | 103–105 | 84 |
| 2 | 0 | H | $C_6H_5$ | $OC_2H_5$ | 81–82 | 60 |
| 3 | 0 | H | $C_6H_5$ | $OCOCH_3$ | 92–94 | 80 |
| 4 | 0 | H | $C_6H_5$ | $N(C_2H_5)_2$ | 110–112 | 79 |
| 5 | 0 | H | $C_6H_5$ | $SC(NH_2)NH, HCl$ | 224–226 | 90 |
| 6 | 0 | H | $C_6H_5$ | SH | 110–111 | 90 |
| 7 | 0 | H | $C_6H_5$ | (benzothiazolyl-S) | 165–168 | 52 |
| 8 | 0 | H | $C_6H_5$ | $SP(S)(OC_2H_5)_2$ | 104–106 | 74 |
| 9 | 0 | H | $C_6H_5$ | SCN | 113–115 | 89 |
| 10 | 1 | H | $C_6H_5$ | Cl | 149–150 | 45 |
| 11 | 2 | H | $C_6H_5$ | Cl | 136–138 | 65 |
| 12 | 1 | H | $C_6H_5$ | $S\text{-}C_6H_4\text{-}Cl$ | 146–147 | 37 |
| 13 | 0 | H | $C_6H_5$ | $OCH(CH_3)_2$ | 96–97 | 43 |
| 14 | 0 | H | $C_6H_5$ | $NHCH_2C_6H_5$ | 148–150 | 58 |
| 15 | 0 | H | $C_6H_5$ | $S\text{-}C_6H_4\text{-}Cl$ | 67–69 | 74 |
| 16 | 0 | H | $C_6H_5$ | $SC(S)OC_2H_5$ | 106–108 | 73 |
| 17 | 0 | H | $C_6H_5$ | $SC(S)NHC_6H_5$ | 130–132 | 95 |
| 18 | 0 | H | (methylphenyl) | Cl | 123–125 | 50 |
| 19 | 0 | H | (methylphenyl) | $N(C_2H_5)_2$ | 75–78 | 68 |

TABLE I — Continued

| Example | n | R₁ | R₂ | X | M.P., degrees | Yield, percent |
|---|---|---|---|---|---|---|
| 20 | 0 | H | (p-CH₃-phenyl) | SC(NH₂)NH, HCl | 219–221 | 74 |
| 21 | 0 | H | (p-CH₃-phenyl) | Cl | 114–116 | 60 |
| 22 | 0 | H | (p-CH₃-phenyl) | SC(S)OC₂H₅ | 106–108 | 78 |
| 23 | 0 | H | (p-CH₃-phenyl) | OCOCH₃ | 118–120 | 81 |
| 24 | 0 | H | (p-CH₃O-phenyl) | Cl | 149–151 | 36 |
| 25 | 0 | CH₃ | C₆H₅ | Cl | 131–133 | 64 |
| 26 | 0 | CH₃ | C₆H₅ | SCN | 136–138 | 82 |
| 27 | 0 | H | C₆H₅ | —N(morpholino) | 164–166 | 60 |
| 28 | 0 | H | C₆H₅ | —SC(S)N(CH₃)₂ | 147–148 | 70 |
| 29 | 0 | H | (thienyl) | Cl | 122–123 | 28 |
| 30 | 0 | H | (thienyl) | S—C₆H₄—Cl | 53–55 | 76 |
| 31 | 0 | H | —C(CH₃)₂—CH₂—C(CH₃)₂—CH₃ | Cl | 96–97 | 37 |
| 32 | 0 | H | —C(CH₃)₂—CH₂—C(CH₃)₂—CH₃ | S—C₆H₄—Cl | 72–73 | 85 |
| 33 | 0 | C₂H₅ | C₂H₅ | Cl | 56–58 | 78 |
| 34 | 0 | C₂H₅ | C₂H₅ | —SC₂H₅ | Oil | 90 |
| 35 | 0 | C₂H₅ | C₂H₅ | —OC₂H₅ | Oil | 91 |
| 36 | 0 | C₂H₅ | C₂H₅ | —N(C₂H₅)₂ | Oil | 62 |
| 37 | 0 | C₂H₅ | C₂H₅ | —S—C₆H₅ | Oil | 88 |
| 38 | 0 | C₂H₅ | C₂H₅ | —N(morpholino) | Oil | 83 |
| 39 | 0 | C₂H₅ | C₂H₅ | —OCOCH₃ | Oil | 71 |
| 40 | 2 | C₂H₅ | C₂H₅ | Cl | Oil | 66 |

EXAMPLE 30

2-p-Chlorophenylthiomethyl-5,6-dihydro-1,4-oxathiin-3-N-cyclohexylcarboxamide (I, $n = 0$, $R_1 = H$, $R_2 =$ cyclohexyl, $X = -SC_6H_4Cl\text{-}p$)

A solution of 2-chloromethyl-5,6-dihydro-1,4-oxathiin-3-N-cyclohexylcarboxamide (13.8 g., 0.050 mole) in benzene (100 ml.) was added in portions to a stirred suspension of the sodium salt of p-chlorobenzenethiol in benzene/DMF 10 percent (500 ml.) at room temperature, and stirring continued for 2 hours. The benzene solution was washed with 100 ml. H₂O, 100 ml. 5% NaOH, and a further 100 ml. H₂O and then evaporated to dryness. The solid was recrystallized from isopropyl alcohol, yield 14.6 g. (76 percent) M.P. 53°–55°.

From the foregoing it will be manifest that typical 2-(substituted-methyl)-5,6-dihydro-1,4-oxathiin-3-carboxamides of the invention may be represented by the formula

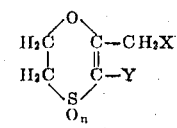

wherein:

$n$ is 0, 1 or 2;

X is a monovalent substituent other than hydrogen or alkyl, notably halogen (e.g., chlorine, bromine, etc.), mercapto, thiocyano, or an organic group, preferably one having up to 10 carbon atoms selected from alkoxy, acyloxy, mono- or di-alkylamino, aralkylamino, alkylthio, arylthio, or haloarylthio, morpholino, -SC(NH₂) NH·HCl

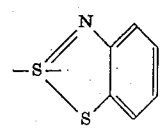

—SP(S)(OC$_2$H$_5$)$_2$, —SC(S)OC$_2$H$_5$, —SC(S)NHC$_6$H$_5$, and —SC(S)N(CH$_3$)$_2$; and Y is carbamoyl (whether substituted or unsubstituted).

In the carbamoyl group as represented by

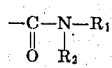

R$_1$ and R$_2$ are of course both hydrogen in the unsubstituted moiety, whereas in the substituted moiety one or both R's are other than hydrogen, as in such preferred monovalent groups as lower alkyl, phenyl, lower alkylphenyl, lower alkoxy phenyl, and cyclohexyl.

An interesting class of chemicals of the invention are those in which the substitution on the 2-methyl group is through a sulfur atom, as represented by the formula:

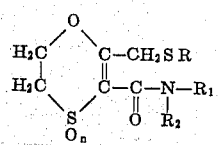

wherein $n$, R$_1$ and R$_2$ may have the values previously assigned (R$_1$ preferably being hydrogen or lower alkyl and R$_2$ preferably being hydrogen or lower alkyl and R$_2$ preferably being phenyl, lower alkyl, lower alkyl phenyl, lower alkoxy phenyl or cyclohexyl) and R is hydrogen, cyano, or a monovalent organic group such as lower alkyl, phenyl, chlorophenyl, —C(NH$_2$)NH.HCl,

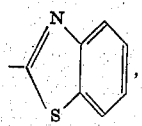

—P(S)(OC$_2$H$_5$)$_2$, —C(S)NHC$_6$H$_5$, —C(S)OC$_2$H$_5$, —C(S)N(CH$_3$)$_{2c}$; etc.

The chemicals of the invention are useful for the control, in vivo or in vitro, of such microorganisms as fungi, especially in agricultural uses, including the control of vegetable and fruit diseases such as blights and leaf spots.

In agricultural applications, the chemical may be applied directly to plants (e.g., seeds, foliage) or to soil in which plant life is growing or is to be grown, to protect the plant life against the harmful effects of such pathogenic microbes as fungi. For example, the chemical may be applied to seeds by tumbling the chemical with the seeds, either alone or in admixture with a powdered solid carrier, to coat the seeds. Typical powdered solid carriers are the various mineral silicates, e.g., mica, talc, pyrophillite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and detailed examples of the same are given in U. S. Pat. No. 2,547,724, columns 3 and 4. As a seed protectant, the amount of the chemical coated on the seeds will be ¼ to 12 ounces per hundred pounds of the seed. As a soil treatment for fungi and the like, the chemical may be applied as a dust in admixture with sand or soil or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil treatment, the amount of the chemical applied to the seed rows the equivalent of an area 2 inches wide and 2 inches deep to parallel rows in one direction a distance of 40 inches apart. Also, as a soil treatment, the chemical may be applied broadcast as a similar dust or aqueous spray with an application rate of 1.0 to 100 pounds per acre. As a foliage treatment (e.g., fungicide), the chemical may be applied to growing plants at a rate of ¼ to 10 pounds per acre. Such application is generally as an aqueous spray which also contains a surface-active dispersing agent, with or without a powdered solid carrier or a hydrocarbon solvent. These sprays usually are repeated at time intervals ranging from 3 days to 2 weeks during the growing season. Typical formulations are as follows:

a) emulsifiable concentrate:
    48.1%   2-chloromethyl-5,6-dihydro-1,4-oxathiin-3-carboxanilide
    11.1%   Tween 80 (polyoxyethylene sorbitan monooleate)
    40.8%   Xylene
   100.0%   Total b) wettable powder:
    75.0%   5,6-dihydro-2-thiocyanomethyl-1,4-oxathiin-3-carboxanilide
    2.0%   Triton X-120*
    2.0%   Daxad-11**
    21.0%   Dixie Clay
   100.0%   Total
   * Alkylaryl polyether alcohol, 0-10 moles polyethylene oxide.
   ** Polymerized sodium salt of alkyl naphthalene sulfonic acid.

Chemicals of the invention distinguish themselves from prior oxathiins by exhibiting unexpectedly greater activity against certain fungi, i.e., *Alternaria solani*, a Deuteromycete which is the causal organism of Tomato Early Blight, and interesting activity against other fungi, i.e., *Uromyces phaseoli*, a Basidiomycete, the causal organism of Bean Rust.

The following examples illustrate the biocidal activity of the chemicals.

EXAMPLE 41

This example evaluates chemicals of the invention as foliage fungicides by their ability to protect plants from subsequent infection by fungus diseases. The procedure employed is exactly as described in Example 7 of U. S. Pat. No. 3,402,241, involving Tomato Early Blight caused by *Alternaria solani*. The results with various chemicals of the invention are shown in Table II, while the data in Table II confirms th effectiveness of the Example 1 chemical at various concentrations.

TABLE II

Tomato Early Blight Test

| Chemical | Percent Disease Control at PPM | |
|---|---|---|
| | 500 | 2000 |

| | | |
|---|---|---|
| Ex. 1 | 93 | 99 |
| Ex. 11 | 84 | 85 |
| Ex. 18 | 75 | 90 |
| Ex. 21 | 35 | 90 |
| Ex. 25 | 85 | 95 |
| Ex. 2 | 25 | 50 |
| Ex. 13 | 25 | 80 |
| Ex. 4 | 77 | 91 |
| Ex. 27 | 77 | 88 |
| Ex. 6 | 25 | 75 |
| Ex. 9 | 77 | 89 |
| Ex. 12 | 40 | 80 |
| Ex. 7 | 50 | 75 |
| Ex. 16 | 68 | 82 |
| Ex. 28 | 57 | 62 |
| Ex. 8 | 50 | 80 |
| Ex. 17 | 50 | 50 |

TABLE III

Tomato Early Blight Test
With Chemical of Ex. 1

| PPM | Percent Control |
|---|---|
| 125 | 83 |
| 250 | 91 |
| 500 | 94 |
| 2000 | 99 |

EXAMPLE 42

The ability to control plant diseases which are already established in the plants (systemic activity) is evaluated by employing the technique described in U.S. Pat. No. 3,402,241, Example 1. The organism is the Bean Rust *Uromyces phaseoli typica Arth.*, in snapbean plants. The results are shown in Table IV.

TABLE IV

Systemic Fungicidal Activity
Against Bean Rust — *Uromyces phaseoli*

| Chemical | Percent Control at PPM | |
|---|---|---|
| | 500 | 2000 |
| Ex. 1 | 65 | 100 |
| Ex. 21 | 25 | 90 |

EXAMPLE 43

Example 41 is repeated using the chemicals shown in TAble V, with the results shown.

TABLE V

Tomato Early Blight Test

| Chemical | Percent Disease Control at PPM | |
|---|---|---|
| | 500 | 2000 |

Preferred chemicals include 2-chloromethyl-5,6-dihydro-1,4-oxathiin-3-carboxanilide (Ex. 1), 2-chloromethyl-5,6-dihdro-1,4-oxathiin-3-(N-methyl)carboxanilide (Ex. 25), 2-chloromethyl-5,6-dihydro-1,4-oxathiin-3-(m-methyl)carboxanilide (Ex. 18), 2-diethylaminomethyl-5,6-dihydro-1,4-oxathiin-3-carboxanilide (Ex. 4), 5,6-dihydro-2-morpholinomethyl-1,4-oxathiin-3-carboxanilide (Ex. 27), 2-chloromethyl-5,6-dihydro-1,4-oxathiin-3-carboxanilide-4,4-dioxide (Ex. 11), and 5,6-dihydro-2-thiocyanomethyl-1,4-oxathiin-3-carboxanilide (Ex. 9).

Having thus described our invention, what we claim and desire to protect by Letters Patent is:

1. A 2-(substituted-methyl)-5,6-dihydro-1,4-oxathiin-3-carboxamide having the formula:

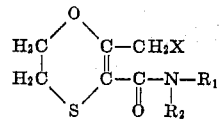

wherein $R_1$ is hydrogen, methyl or ethyl, $R_2$ is phenyl, methylphenyl, methoxyphenyl, cyclohexyl, or tertiary octyl and X is chloro.

2. A chemical as in claim 1 in which $R_1$ is hydrogen and $R_2$ is phenyl.

3. A chemical as in claim 1 which is 2-chloromethyl-5,6-dihydro-1,4-oxathiin-3-carboxanilide.

4. A chemical as in claim 1 which is 2-chloromethyl-5,6-dihydro-1,4-oxathiin-3-(N-methyl) carboxanilide.

5. A chemical as in claim 1 which is 2-chloromethyl-5,6-dihydro-1,4-oxathiin-3-(m-methyl) carboxanilide.

* * * * *